(12) United States Patent
Steadman

(10) Patent No.: US 6,877,805 B1
(45) Date of Patent: Apr. 12, 2005

(54) SEATING APPARATUS

(75) Inventor: William David Steadman, Port Saint Lucie, FL (US)

(73) Assignee: William Steadman, Port Saint Lucie, FL (US)

( * ) Notice: Subject to any disclaimer, the term of this patent is extended or adjusted under 35 U.S.C. 154(b) by 591 days.

(21) Appl. No.: 09/630,513

(22) Filed: Aug. 2, 2000

(30) Foreign Application Priority Data

Aug. 3, 1999 (GB) .............................. 9918139

(51) Int. Cl.⁷ .............................................. A47C 13/00
(52) U.S. Cl. .................... 297/130; 297/133; 297/250.1; 297/344.18
(58) Field of Search ................................ 297/133, 130, 297/250.1, 344.18

(56) References Cited

U.S. PATENT DOCUMENTS

| 2,790,484 | A | * | 4/1957 | Pollack |
| 3,944,241 | A | | 3/1976 | Epelbaum |
| 4,065,175 | A | * | 12/1977 | Perego |
| 4,079,991 | A | * | 3/1978 | Harris |
| 4,394,046 | A | | 7/1983 | Irwin et al. |
| 4,718,715 | A | * | 1/1988 | Ho |
| 4,946,180 | A | | 8/1990 | Baer |
| 4,964,180 | A | | 10/1990 | Harbeke |
| 5,118,163 | A | * | 6/1992 | Brittian et al. |
| 5,230,523 | A | * | 7/1993 | Wilhelm |
| 5,398,951 | A | | 3/1995 | Ryu |
| 6,398,297 | B1 | * | 6/2002 | Cantwell |

FOREIGN PATENT DOCUMENTS

FR 2666283 * 8/1990

* cited by examiner

Primary Examiner—Milton Nelson, Jr.
(74) Attorney, Agent, or Firm—Watts Hoffmann Co., L.P.A.

(57) ABSTRACT

Seating apparatus 10 including a seat 12 and a support arrangement 22. The support arrangement 22 comprises legs 24, 26 pivotally mounted on opposite sides of the seat 12. The legs 24, 26 are selectively movable between a ground engaging position wherein the seat 12 is supported above the ground, and a stowed position in which the legs 24, 26 of the support arrangement 22 lie against the sides of the seat 12. The apparatus 10 can be used for a multitude of purposes, for example a car seat, a high chair and as a rocking chair.

33 Claims, 2 Drawing Sheets

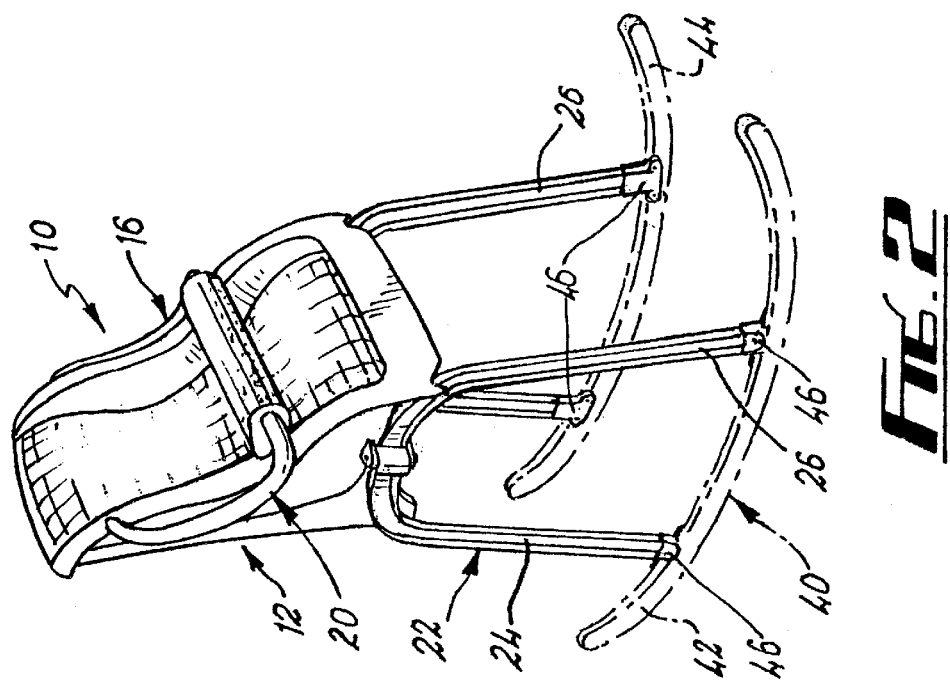
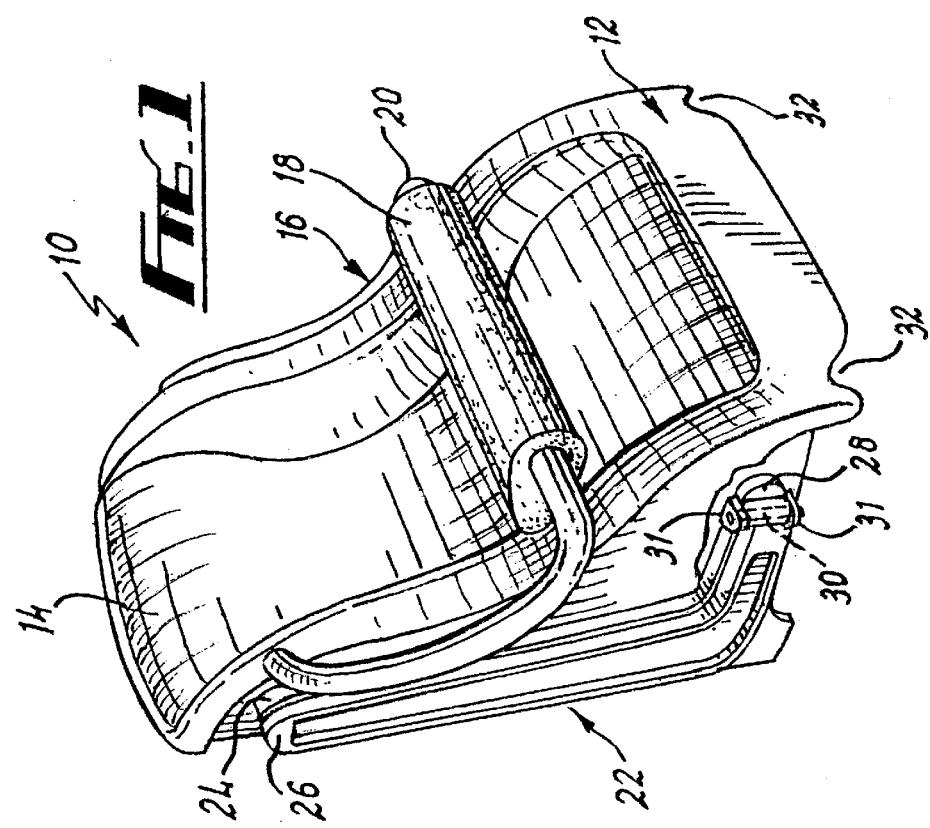

SEATING APPARATUS

This invention relates to a seating apparatus, particularly but not exclusively seating apparatus for children, and especially a car seat.

Such seating arrangements are known. Car safety seats are regularly used in cars for transporting children. These seats have the disadvantage that they can generally only be used for one purpose. Obtaining seating for children can often be problematic in places like restaurants. Often a high-chair is not available when needed.

This invention relates to a seating apparatus comprising seating means and support means connected to the seating means, the support means being selectively movable between a ground engaging position to support the seating means spaced above the ground, and a stowed position in which the support means are located substantially alongside the seating means.

The support means may comprise first and second support parts each located on an opposite side of the seating means. The support parts may be pivotally mounted on the respective sides of the seating means. The support parts may be pivotally mounted about in use generally horizontal axes. The support parts may be pivotally mounted on pivot points which are moulded into the seating means.

The respective support parts may each comprise first and second members. The first and second members are preferably inter-connected by means of a pivotal arrangement. The pivotal arrangement may be pivotally mounted onto the seating means. In both the ground engaging position and the stowed position the pivotal arrangement may be such as to comprise a substantially vertical axis. Each member may consist of a beam of I-shaped cross-section. Each respective member may be elongate with a generally L-shape. The respective members may be inter-connected at the respective ends of their respective bases. Preferably in the ground engaging position the stems of the respective members point downwardly.

In the stowed position the first and second member may lie one upon the other.

In the ground engaging position the first and second member may together define an n-shape. The respective members may comprise means for providing grip on the ground. In the stowed position the stems of the respective members may be aligned in an approximately vertical direction.

The seating means may be provided with a securing means for securing the support means in the ground engaging position. The securing means may comprise a formation for engaging with the support means. The formation may engage with a member. The formation may comprise on or more recesses which accept a member or members in the ground engaging position.

Rocking means may be provided for the seating means. The rocking means may be provided by the shape of the underside of the seating means.

Alternatively, rocking means may be provided which are selectively mountable onto the support means in the ground engaging position to enable the seating means to rock. The rocking means may comprise two curved ground engagable rocking members. The rocking members may each be selectively mountable on the first and second members, and may comprise respective upwardly facing sockets.

The support means may be adjustable in length. The respective first and second member may each comprise a telescopic arrangement. The telescopic arrangement may comprise means for locking a telescopic part in a required position. The locking means preferably comprise a locking member for engaging with holes which are provided on the telescopic part. The locking member may comprise a pin and/or a spring means. The locking member may comprise a plastic clip. Preferably the telescopic part comprises grip means for providing grip on the ground.

In the stowed position the seating means may be shaped so as to be able to rest on a surface. The base and/or back of the seating means may be shaped to rest against a surface.

The seating means may consist of a vehicle child seat mountable in a vehicle. The vehicle child seat may comprise means for connecting said seat to a vehicle. The vehicle child seat may comprise means for connecting said seat to a vehicle's seat-belt. The connection means may comprise straps and/or belts.

The seating means is preferably portable and may comprise a carrying handle. The handle may be arranged such that a table or other item is selectively mountable thereon.

Embodiments of the present invention will now be described by way of example only with reference to the accompanying drawings in which:

FIG. 1 is a diagrammatic perspective view of seating apparatus according to the invention in a stowed position;

FIG. 2 is a diagrammatic perspective view of the seating apparatus of FIG. 1 in a ground engaging position.

Figure 3:
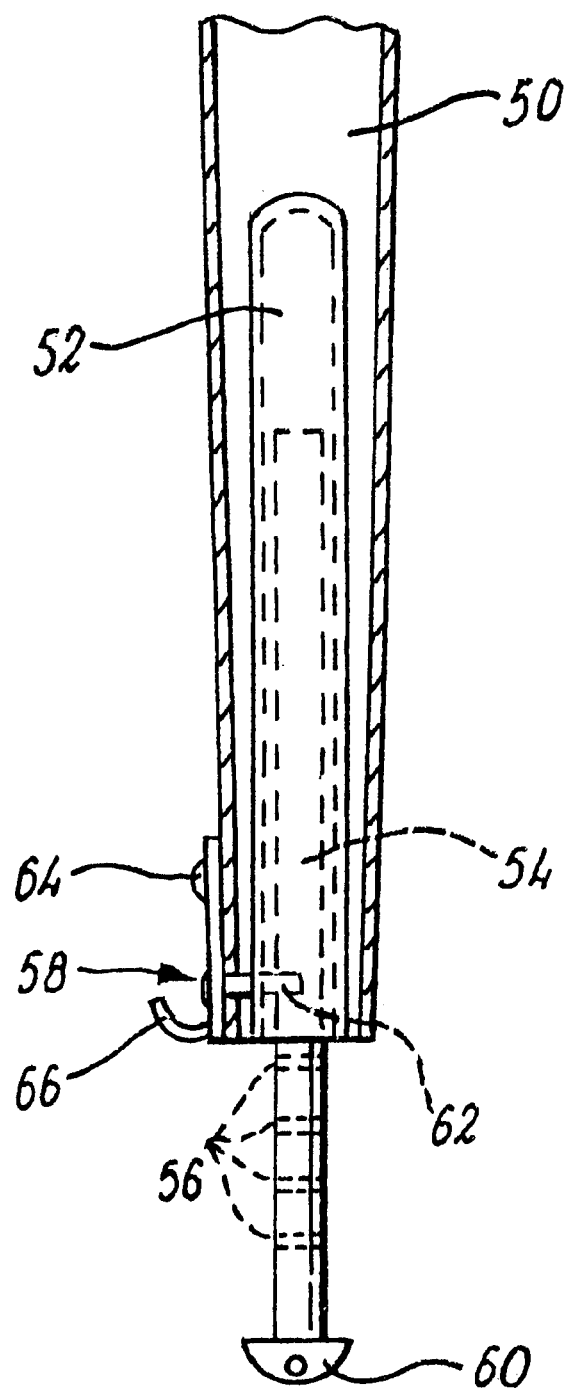
FIG. 3 shows part of an alternative embodiment of seating apparatus according to the invention.

FIGS. 1 and 2 shows a seating apparatus 10 which is suitable for a child. The apparatus comprises a seat 12 which is ergonomically shaped to provide a good seating position for a child. A support arrangement 22 connected to the seat 12 on either side. The seat 12 principally is made of moulded plastics material. On the seat there is attached a cushion 14 to provide comfort for a child. The seat 12 is further provided with a handle 16 for lifting and transporting the apparatus 10. The handle 16 comprises a generally U-shaped frame 20 which is pivotally connected to either side of the seat 12. Mounted on the base of the U of the frame 20 is a further cushion 18. The cushion 18 not only provides more comfort during lifting and transportation of the sat 10, but also serves as a barrier to prevent a child from falling out of the seat.

On each side of the seat 12 the support arrangement 22 comprises two generally L-shaped legs 24 and 26. The legs 24, 26 have arm positions which are connected at respective ends to a mounting bracket 28. The bracket is pivotally mounted on the seat 12 for rotation about a substantially horizontal axis. The legs 24, 26 are pivotally mounted on the bracket 28 about a pin 30 extending between two projections 31.

The legs 24, 26 are moveable between a stowed position, as shown in FIG. 1, and a ground engaging position, as shown in FIG. 2. In the stowed position the legs 24, 26 lie against each other and the sides of the section 12. Stem portions of the legs point upwardly from the arm portions. In the position in FIG. 1 the seat 10 is then usable as a car seat. The seat 12 can be provided with fastenings for fastening the child into the seat 12. Also, the seat 12 can be provided with a belt or straps for fastening the seat 12 into a vehicle.

FIG. 2 shows the support arrangement 22 in the ground engaging position. In this position, the seat is suited to be used as a high-chair. Provided on the front of the seat 12 are two slots 32. The slots 32 are located to accept for engaging with respectively one of the legs 22, 24 when in the ground engaging position to lock the apparatus in this position. The legs 24, 26 can only be moved into or out of the slots 32 when the legs 22, 24 are not ground engaging. In this way, an automatic securing of the apparatus 10 in this position is achieved. This offers safety to the child when seated in the high-chair configuration.

Shown in dotted lines in FIG. 2 is a rocking attachment 40 which can be fitted to the apparatus 10 when in the ground engaging position. The attachment 40 comprises two curved elongated ground engagable members 42, 44, each with a spaced pair of upwardly open sockets 46 which locate the free end of the legs 24, 26. With the attachment 40 the high-chair configuration can be used as a rocking chair.

FIG. 3 shows a further embodiment of the invention wherein the legs 50 are adjustable in length. The legs 50 comprise a hollow body 52 in which a telescopic leg 54 is slidingly arranged. The telescopic leg 54 comprises a plurality of spaced holes 56, and a rubber stop 60 for providing grip on the floor. On the leg 50 there is further provided an adjustment member 58. The adjustment member comprises a pin 62 for engaging with the holes 56 of the telescopic leg 54, and a handle 66 for operating the adjustment member 58. The adjustment member is connected to the leg 50 by means of a screw 64. The position of the telescopic leg 54 can be selectively adjusted by means of the adjustment member 58, locating in a required hole 56.

There is thus described a seating apparatus which can be used for a multitude of purposes. The seating apparatus can be used as a rocking chair, as a car seat and as a high-chair. The folding of the legs resting alongside the seat provides a compact arrangement of the apparatus. This reduces storage space required by the apparatus. By using legs constructed out of material of an I-shaped cross-section, the legs are light-weight but of a rigid construction. The slot for securing the legs has the advantage that it automatically engages with the legs when the legs are in the ground engaging position. The legs cannot be moved out of the slot with the legs engaging with the ground. This provides a secure arrangement, preventing the high-chair from suddenly collapsing causing injuries to the child.

Various modifications may be made without departing from the scope of the invention. Whilst described as a children's chair, the seating means could also be of a size suitable for seating grown-ups. In addition, the seating means can consist of a reclinable chair, a cot or a bed. Securing means may also be provided in the stowed position to prevent the legs from accidentally moving out of this position. The handle which is connected to the seat for lifting and transporting the seat may be fitted with a table. This has the particular advantage that the child can have its food, toys, etc. within easy reach. The underside of the seating means could be shaped so as to rock on the ground when the support arrangement is in the stowed position.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

What is claimed is:

1. Seating apparatus comprising seating means and support means connected to the seating means:
   a) the support means being selectively movable between a ground engaging position to support the seating means spaced above the ground, and a stowed position in which the support means are located substantially alongside the seating means;
   b) the support means comprising first and second support parts each pivotally mounted on an opposite side of the seating means, the pivotal mounting being rotatable about an in use generally horizontal axis;
   c) the support part pivotal mountings being on pivot points which are moulded into the seating means;
   d) the support parts being inter-connected by means of a further pivotal arrangement;
   e) the further pivotal arrangement in both the ground engaging position and the stowed position is such as to comprise a substantially vertical axis; and,
   f) each support part consists of a beam of I-shaped cross-section.

2. Seating apparatus according to claim 1, wherein the support parts are members and each respective member is elongate with a generally L-shape.

3. Seating apparatus according to claim 2, wherein the respective members are inter-connected at the respective ends of their respective bases.

4. Seating apparatus according to claim 3, wherein in the ground engaging position stems of the respective members point downwardly.

5. Seating apparatus according to claim 4, wherein in the stowed position the first and second members lie one upon the other.

6. Seating apparatus according to claim 5, wherein in the ground engaging position the first and second member together define an n-shape.

7. Seating apparatus according to claim 1, wherein the support parts each include a stem and in the stowed position the stems of the respective support parts are aligned in an approximately vertical direction.

8. Seating apparatus according to claim 1, wherein the seating means is provided with a securing means for securing the support means in the ground engaging position.

9. Seating apparatus according to claim 8, wherein the securing means comprises a formation for engaging with the support means.

10. Seating apparatus according to claim 9, wherein the formation engages with a respective member.

11. Seating apparatus according to claim 10, wherein the formation comprises at least one recess with each such recess accepting a member in the ground engaging position.

12. Seating apparat according to claim 1, wherein rocking means are provided for the seating means.

13. Seating apparatus according to claim 12, wherein the rocking means are selectively mountable onto the support means in the ground engaging position to enable the seating means to rock.

14. Seating apparatus according to claim 13, wherein the rocking means comprise two curved ground engagable rocking members.

15. Seating apparatus according to claim 14, wherein the rocking members are each selectively mountable on the first and second parts.

16. Seating apparatus according to claim 14, wherein the rocking members comprise respective upwardly facing sockets.

17. Seating apparatus according to claim 1, wherein the support means are adjustable in length.

18. Seating apparatus according to claim 1 wherein the support parts each comprise first and second members and the respective first and second members each comprise a telescopic arrangement.

19. Seating apparatus according to claim 18, wherein the telescopic arrangement comprises means for locking a telescopic part in a required position.

20. Seating apparatus according to claim 19, wherein the telescopic part comprises grip means for providing grip on the ground.

21. Seating apparatus according to claim 19, wherein the locking means comprise a locking member for engaging with holes which are provided on the telescopic part.

22. Seating apparatus according to claim 21, wherein the locking member comprises a selected one of a pin and a spring means.

23. Seating apparatus according to claim 21, wherein the locking member comprises a plastic clip.

24. Seating apparatus according to claim 1, wherein in the stowed position the seating means is shaped so as to be able to rest on a surface.

25. Seating apparatus according to claim 1, wherein the seating means consists of a vehicle child seat mountable in a vehicle.

26. Seating apparatus according to claim 25, wherein the vehicle child seat comprises means for connecting said seat to a vehicle.

27. Seating apparatus according to claim 25, wherein the vehicle child seat comprises means for connecting said seat to a vehicle's seat-belt.

28. Seating apparatus according to claim 27, wherein the connection means comprises a selected one of straps and belts.

29. A portable childs seat comprising:

a) a body support portion between spaced side portions;

b) a spaced pair of brackets respectively rotatively mounted on outboard surfaces of the side portions each for rotation about an axis, the axis being horizontal when the seat is in use;

c) two pairs of L-shaped legs, each pair having arm portions pivotally connected to an associated one of the brackets;

d) each said pivotal connection having an axis generally orthogonal to the axis of rotation of the associated bracket;

e) each leg pair having a storage and vehicle use position adjacent an associated one of the out board surfaces;

f) each leg pair also having a support position wherein stem portions of the legs extend below the seat to support the seat in an elevated position above a surface.

30. The seat of claim 29, wherein the arm portions are generally horizontal when the seat is in use in each of the vehicle use and the support positions.

31. The seat of claim 29 wherein the stem portions generally parallel a seat back when in the storage position.

32. The seat of claim 29 wherein the stem portions of each leg pair are in the support position and connected to an associated one of a pair of rockers.

33. Seating apparatus according to claim 29, wherein the seat includes a carrying handle.

* * * * *